May 31, 1938.   J. A. LITZLER   2,119,464
INTERNAL COMBUSTION ENGINE
Filed Dec. 28, 1936   3 Sheets-Sheet 1

Inventor
Joseph A. Litzler,
By J. Stanley Burch
Attorney

Inventor
Joseph A. Litzler

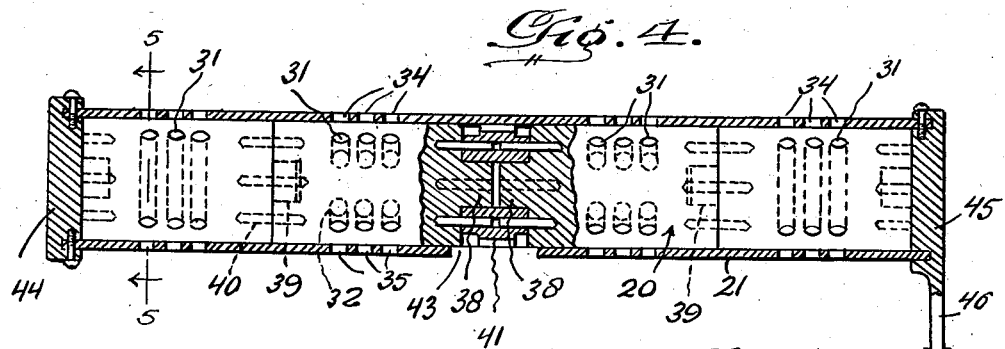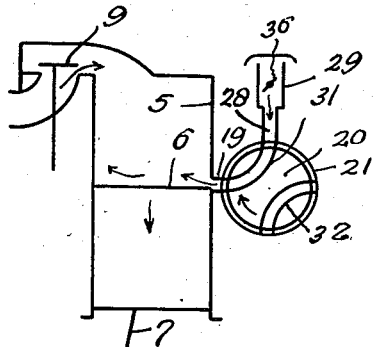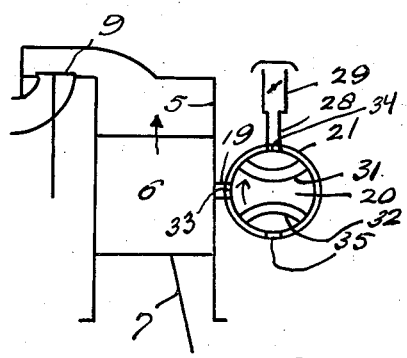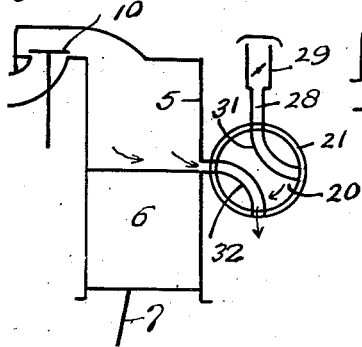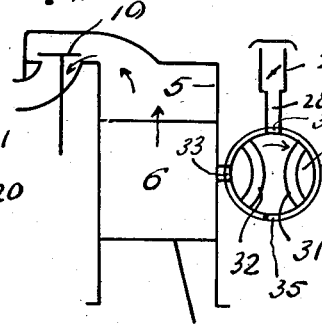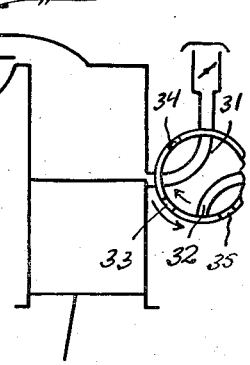

Patented May 31, 1938

2,119,464

UNITED STATES PATENT OFFICE 2,119,464

INTERNAL COMBUSTION ENGINE

Joseph A. Litzler, Enid, Okla.

Application December 28, 1936, Serial No. 117,990

3 Claims. (Cl. 123—76)

This invention relates to an improved internal combustion engine of the four cycle type, and the primary object of the present invention is to provide an engine of the above kind which is economical to produce and operate, as well as efficient and powerful in operation.

More particularly, the present invention contemplates the provision of an engine of the above kind having novel and efficient means for controllably supplying additional air to the cylinders of the engine during completion of the intake strokes of the pistons in such cylinders, and for permitting partial exhaust of the products of combustion and consequent partial release of pressure from said cylinders at the completion of the power strokes of said pistons. In this way, I provide for maximum power output and economical consumption of fuel, as well as relieving the conventional exhaust valves of much of their work and more nearly scavenging the cylinders.

A further and more specific object of the present invention is to provide simple and efficient means for controlling the passage of additional air to the engine cylinders and partial exhaust of products of combustion from said cylinders, so that the engine will operate at lower speeds only on the normal fuel supply and exhaust under control of the usual intake and exhaust valves, but will operate at the higher speeds where the efficiency of an engine normally drops, with the charges supplemented by additional air and the exhaust pressure partially relieved by said controlling means.

A still further object of the present invention is to provide an improved means for controlling the supply of additional air and partial exhaust of products of combustion to and from the engine cylinders, respectively, such improved means embodying a rotary valve, and an oscillating sleeve valve controlling communication with the engine cylinders through said rotary valve and operatively connected with the usual throttle valve which controls the volume of fuel supplied to the cylinders for varying the speed of the engine.

A more general object of the present invention is to provide an improved valve mechanism for internal combustion engines embodying a rotary cylindrical valve, and a manually operable oscillating sleeve valve for controlling communication with the engine cylinders through said rotary valve and in which the rotary valve is journaled.

Still another object of the present invention is to provide thermostatic means for controlling the supply of air to the means for controlling the passage of additional air to the engine cylinders, such thermostatic means being responsive to the heat of the engine cylinders so that the additional air will be supplied to the cylinders only after the latter have attained a predetermined temperature or heated condition. In this way, efficient starting and operation of the engine until heated up is insured before the additional air may be supplied to the cylinders.

With the above general objects in view, and others that will become apparent as the nature of the invention is better understood, such invention consists in the novel form, combination and arrangement of parts hereinafter more fully described, shown in the accompanying drawings, and claimed.

In the drawings:

Figure 4 is an enlarged central longitudinal section taken through the rotary valve and the oscillating sleeve valve in which said rotary valve is fitted.

Figures 6, 7, 8, 9 and 10 are diagrammatic views illustrating different positions of the valves and pistons with respect to each cylinder of the engine when the latter is in operation.

Figure 1:
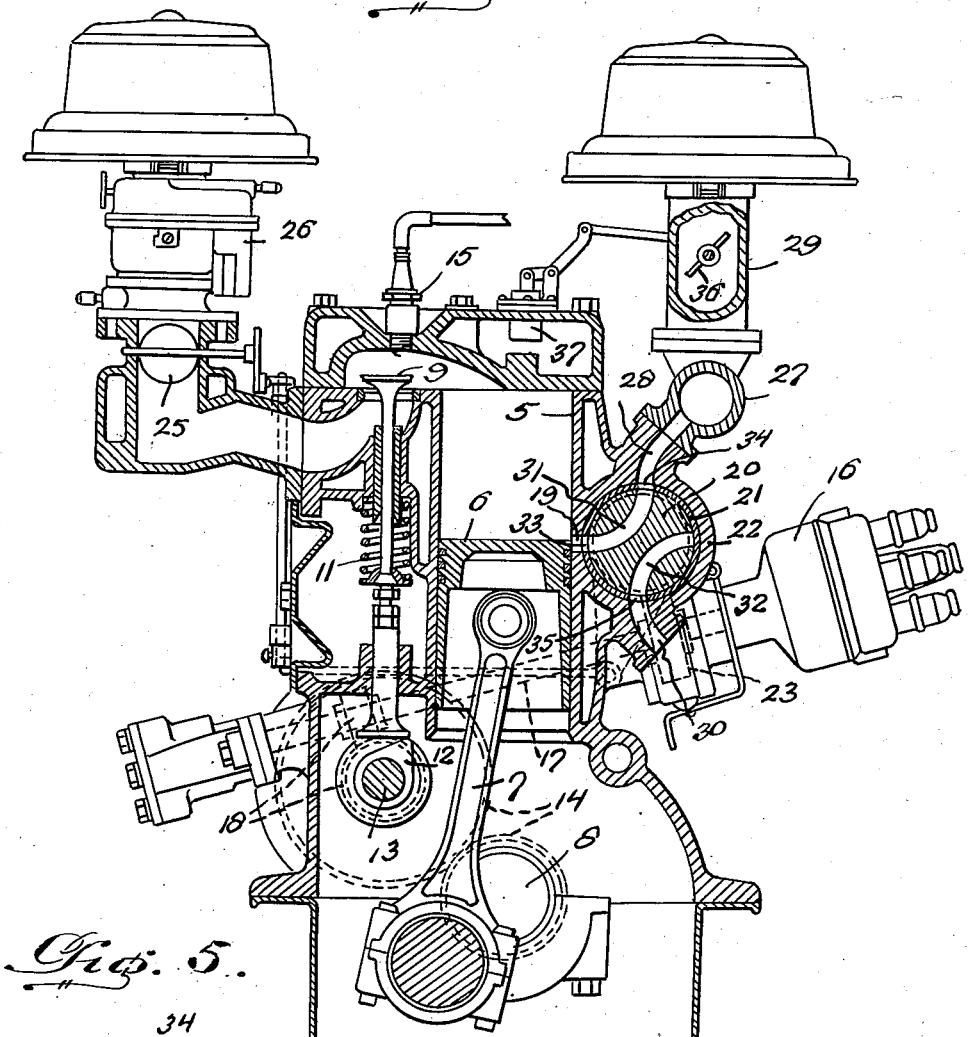
Figure 1 is a view of an internal combustion engine embodying the present invention, partly in vertical transverse section, and partly in elevation.
Figure 5:
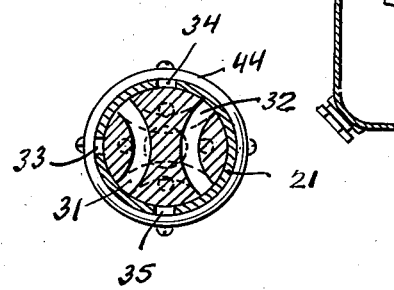
Figure 5 is a transverse section on line 5—5 of Figure 4.
Figure 2:
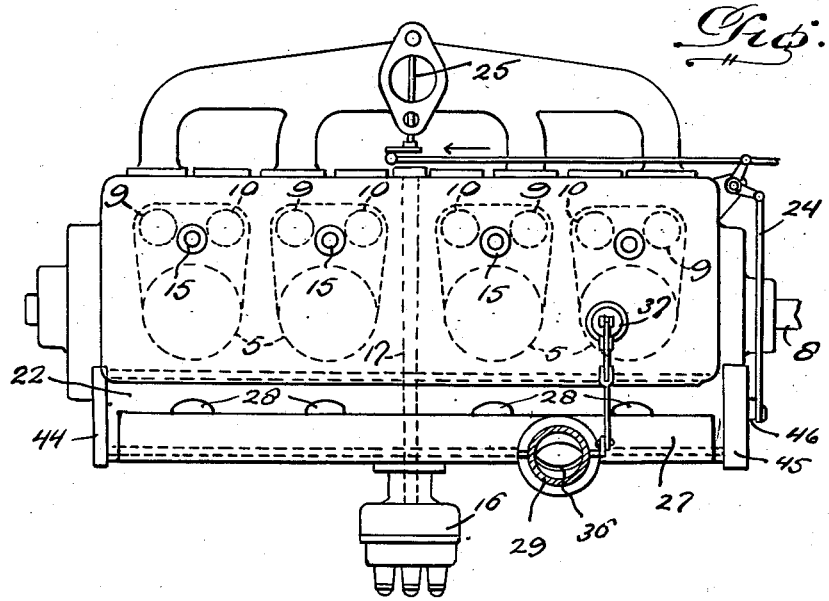
Figure 2 is a somewhat diagrammatic top plan view of the engine shown in Figure 1, drawn on a smaller scale and with parts omitted for sake of clearness.
Figure 3:
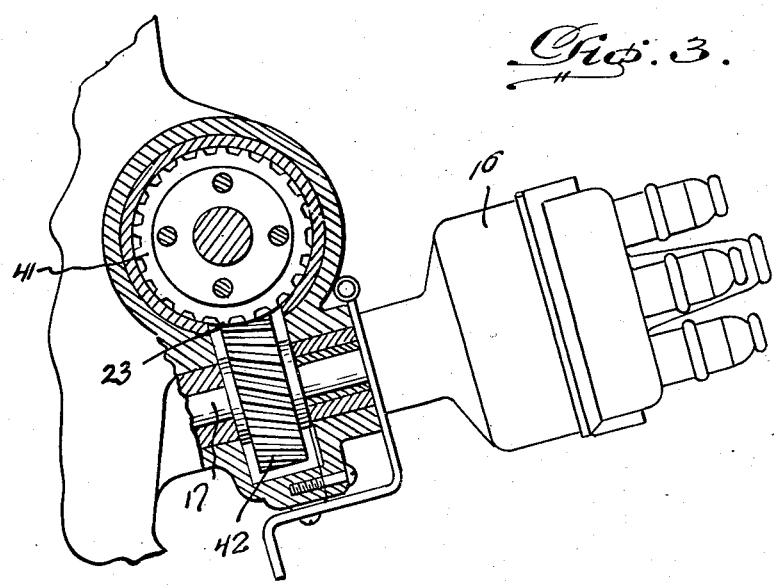
Figure 3 is an enlarged fragmentary view partly in section, illustrating the gearing between the driven shaft and the rotary valve of Figure 1.

The engine illustrated has four cylinders 5 in each of which is fitted a piston 6 connected by a rod 7 with a crank shaft 8 in the usual manner. Intake and exhaust valves 9 and 10 respectively are located at or near the outer end of each cylinder, each valve being normally seated by a spring 11 and unseated at predetermined intervals by a cam 12 on the cam shaft 13 geared by a two-to-one gearing at 14 to the crank shaft 8. Ignition current is supplied at proper intervals to the spark plugs 15 through a distributor 16 in a well known manner, the rotor of the latter being carried by one end of a shaft 17 extending transversely of the engine and geared at the other end to the cam shaft 13 as at 18.

Each cylinder 5 has one or more ports 19 arranged to be uncovered on the inside of the cylinder by the piston 6 of said cylinder and at the end of the instroke of said piston. The ports 19 are controlled on the outside by a rotary valve 20 and an oscillating sleeve valve 21 common to all cylinders, the valve 20 being rotatably fitted in the valve 21, and the valve 21 being rotatably fitted in a cylindrical valve casing 22. The valve 20 is geared by a two-to-one gearing at 23 to and driven by shaft 17, while valve 21 is within control of the operator and operatively connected as at 24 with the throttle valve 25 which controls the supply of fuel from the carburetor 26 to the engine cylinders. Mounted on the valve casing 22 is an air intake manifold 27 communicating with ports 28 provided in the top of said valve casing 22, and having an air inlet 29. The valve casing 22 also has ports 30 in the bottom thereof, and the ports 19, 28 and 30 are controlled by the valves 20 and 21. The rotary valve 20 is solid and formed with arcuate transverse passages 31 and 32 for connecting ports 28 within ports 19 and ports 19 with ports 30 under certain conditions and at predetermined intervals. The valve 21 has ports 33, 34 and 35 adapted to be simultaneously registered with ports 19, 28 and 30 respectively or moved out of registry with the latter.

Arranged in the air inlet 29 is an air-throttle valve 36 under control of a thermostat 37 responsive to the temperature of the engine as reflected by the cooling system of the latter.

Assuming that the engine is not running and cold, the fuel throttle valve 25, sleeve valve 21, and air-throttle valve 36 will be closed, and these valves will remain closed or substantially closed (see Figure 10) when the engine is started and running at idling or the relatively lower speeds. When the throttle valve 25 is opened to cause the engine to run at the relatively higher speeds, the sleeve valve 21 is simultaneously opened. As soon as the engine becomes heated, the air-valve 36 will be opened by thermostat 37, whereupon air is admitted to manifold 27. As each piston 6 approaches the end of its intake stroke, it uncovers the ports 19 of its cylinder 5 and admits a charge of atmospheric air beneath the fuel charge which has been drawn into said cylinder past its intake valve 9, as shown in Figure 6. At this time, the valve 20 connects ports 28 and 19 through ports 33 and 34 of valve 21 as shown, the charge of air entering the cylinder due to the partial vacuum existing at this time in the cylinder. On the subsequent compression stroke of the piston, the latter closes ports 19, and valve 20 turns to a position to also close such ports 19 as shown in Figure 7. At the end of the power stroke of the piston, which follows, the ports 19 are uncovered by said piston and connected by valve 20 with ports 30, partially releasing the pressure in the cylinder by allowing some of the exhaust gases to pass outwardly through said valve 20 as shown in Figure 8. The remaining exhaust gases are then forced out of the cylinder past its exhaust valve 10 by the piston during the subsequent exhaust stroke of the latter as shown in Figure 9. Obviously, the ports 30 may lead to a common exhaust manifold in a manner similar to the communication of air intake passages 28 with air intake manifolds 27.

To facilitate manufacture, assembly and repair, the rotary valve 20 is preferably composed of a plurality of sections arranged end to end, one for each cylinder, as shown in Figure 4, each section having an axial projection 38 at one end and a corresponding axial recess or socket 39 at the other end. The projections 38 of the outer sections of valve 20 are adapted to enter the sockets 39 of the inner sections thereof to axially aline the sections thus interengaged, relative turning of such sections being prevented by means of longitudinally extending pins at 40 entering a plurality of alined and relatively smaller sockets in the opposed ends of adjacent sections of said valve 20. The projections 38 of the inner sections of valve 20 are thus opposed at the inner ends of the latter, and a gear 41 may be fitted on these opposed projections 38 to provide part of the gearing 23 between the valve 20 and shaft 17, such gearing being completed by another gear 42 secured on said shaft 17. In order to permit intermeshing of the gears 42 at adjacent sides, the surrounding sleeve valve 21 may be cut away at one side as indicated at 43. It will thus be seen that the sections of valve 20 are interchangeable or of similar form so that only one form of valve section is required to be assembled in plurality to construct the complete valve 20. While this is a very simple and efficient arrangement for driving valve 20, it is obvious that other forms of gearing may be provided between the cam shaft 13 and valve 20. The sleeve valve 21 is closed at the end by suitable caps 44 and 45, the cap 45 having a projecting arm 46 for connection at 24 with the means for manually actuating the throttle valve 25.

From the foregoing description, it is believed that the construction and operation, as well as the advantages of the present invention will be readily understood and appreciated by those skilled in the art. It will be seen that the air for augmenting the normal charges is primarily under control of the operator due to opening of valve 21 when the throttle valve 25 is opened, and to closing of valve 21 when throttle valve 25 is closed. This insures admission of the additional air only at the relatively higher engine speeds, preventing admission of such additional air at the relatively lower engine speeds when the throttle valve 5 is closed or nearly closed. However, the admission of additional air is also prevented at relatively high engine speed until the engine has become properly heated and capable of advantageously utilizing the additional air, this being accomplished by the use of the thermostatically operated air control valve 36 in the inlet 29 of air intake manifold 27. Due to a slight vacuum which exists in each cylinder at the end of the intake stroke of the piston in such cylinder, a charge of cool air at atmospheric pressure is admitted to the cylinder at that time under the fuel already taken in through the conventional fuel intake valve. This has the effect of filling the cylinder as nearly as possible without the use of expensive and complicated superchargers for forcing air into the cylinders under pressure. Also, on the exhaust stroke of each piston, the pressure is partially released through the rotary valve so as to relieve the conventional exhaust valve of much of its work and lengthening the life of said conventional exhaust valve. In addition, the pressure in the cylinder is reduced against which the piston has to force out the expanded exhaust gases, thus providing for nearly complete scavenging of the cylinders.

Minor changes in the details of construction illustrated and described by way of example, are contemplated within the spirit and scope of the invention as claimed.

What I claim as new is:

1. In a four cycle internal combustion engine, a cylinder, a piston working in said cylinder, said cylinder having a single port arranged to be uncovered on the inside of the cylinder by said piston at the end of the instroke of said piston, a rotary valve arranged to control said port on the outside of said cylinder, and mechanism operated by said piston for rotating said valve to admit air at atmospheric pressure through said port to said cylinder directly above and at the end of the intake stroke of the piston, and for permitting partial exhaust of products of combustion through said port from the cylinder at the end of the power stroke of said piston.

2. In a four cycle internal combustion engine, a cylinder, a piston working in said cylinder, rotary valve mechanism operated by said piston for admitting air at atmospheric pressure to said cylinder directly above and at the end of the intake stroke of the piston and for permitting partial exhaust of products of combustion from the cylinder at the end of the power stroke of said piston, a manually operable valve for controlling the admission of fuel to the cylinder for varying the speed of the engine, and a sleeve valve operatively connected with said fuel control valve for preventing admission of additional air to the cylinder by means of said valve mechanism when said fuel control valve is closed or nearly closed to cause operation of the engine at relatively lower engine speeds, and for permitting admission of the additional air by said valve mechanism when said fuel control valve is opened to cause operation of the engine at the relatively higher engine speeds.

3. In a four cycle internal combustion engine, a cylinder, a piston working in said cylinder, rotary valve mechanism operated by said piston for admitting air at atmospheric pressure to said cylinder directly above and at the end of the intake stroke of the piston and for permitting partial exhaust of products of combustion from the cylinder at the end of the power stroke of said piston, a manually operable valve for controlling the admission of fuel to the cylinder for varying the speed of the engine, and an oscillatory sleeve valve operatively connected with said fuel control valve for preventing admission of additional air to the cylinder by means of said valve mechanism when said fuel control valve is closed or nearly closed to cause operation of the engine at relatively lower engine speeds and for permitting admission of the additional air by said valve mechanism when said fuel control valve is opened to cause operation of the engine at the relatively higher engine speeds, said valve mechanism including a rotary cylindrical valve journaled in said sleeve valve.

JOSEPH A. LITZLER.